3,235,500
GREASE COMPOSITION
Max J. Wisotsky, University Park, Pa., and Norman R. Odell, Wappingers Falls, N.Y., assignors to Texaco Inc., New York, N.Y., a corporation of Delaware
No Drawing. Filed Dec. 27, 1962, Ser. No. 247,548
11 Claims. (Cl. 252—49.6)

This invention relates to pigment thickened lubricating greases and, more particularly, to pigment thickened silicone polymer oil grease compositions having improved yield characteristics.

In commonly-assigned U.S. 2,880,177 there is disclosed high temperature grease compositions consisting essentially of lubricating oils thickened with particular compounds of a class of high melting point temperature diazotized benzidine derivatives.

It has now been found that the incorporation of a minor amount of a yield improving agent comprising a saturated aliphatic fatty acid containing from 16 to 20 carbon atoms in the fatty acid moiety and having a monocyclic aryl or a $C_1$–$C_3$ alkyl substituted monocyclic aryl group on the aliphatic carbon chain to the diazotized benzidine pigment thickened oleaginous silicone polymer fluid results in an unexpected improvement in the consistency value of the resulting grease compositions. In addition, the use of a minor amount of the aryl substituted $C_{16}$–$C_{20}$ fatty acids in the pigment thickened grease composition permits a reduction in the pigment content of the grease whereby a higher percentage of lubricant components can be present in the grease.

In accordance with the present invention, the grease compositions comprise a chlorophenyl silicone polymer base fluid having a viscosity in the lubricating oil range thickened to a grease consistency with a thickening agent consisting essentially of a diazotized benzidine pigment having the general formula:

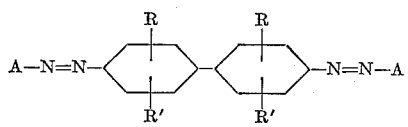

wherein A is selected from the group consisting of acylacetarylamide and N-arylpyrazolone radicals and their substituted derivatives, and wherein R and R' are hydrogen atoms or methyl, methoxy or chlorine substituents. The acylacetarylamide or N-arylpyrazolone radical portion of the benzidine pigment may contain substituents of various types such as, for example, alkyl, aryl, alkaryl, aralkyl groups or groups represented by the following formulas —OR″, —COOR″, —OH, —NO₂, —NHR″, NH₂, —NR″R‴, halogens and the like, wherein R″ and R‴ represent alkyl or aryl groups, said grease composition containing a saturated aliphatic fatty acid having from 16 to 20 carbon atoms in the fatty acid moiety and having a monocyclic aryl or a $C_1$–$C_3$ alkyl substituted-monocyclic aryl group attached to the aliphatic carbon chain, in an amount sufficient to improve the yield of the resulting grease compositions. The monocyclic substituted aliphatic fatty acid is present in the grease in an amount of from about 0.5 to about 3 percent by weight.

The silicone polymer base oil should comprise from about 51 to about 90%, preferably 60–75%, by weight of the base oil.

The methylchlorophenyl silicone base oil is a compound represented by the formula:

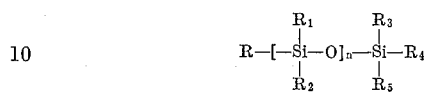

wherein R, $R_1$, $R_2$, $R_3$, $R_4$, and $R_5$ are methyl, phenyl or chlorinated phenyl groups, preferably at least about 35% of such groups being methyl groups and with sufficient chlorinated phenyl groups to give a chlorine content of at least about 3% by weight to the polymer and n is an integer of sufficient size to give a polymer having a viscosity in the lubricating oil viscosity range. The preferred silicone oils are those having a viscosity in the range from about 100 seconds to 600 seconds Saybolt Universal at 100° F., and containing about 4 to 12% by weight of chlorine. A particularly suitable material of this character is the commercial product sold under the trade name "Versilube F–50" having an average molecular weight of about 3,233, a viscosity of about 180 to 280 seconds Saybolt Universal at 100° F. and containing about 33.6% silicon and 7.18% of chlorine by weight of analysis. Another suitable silicone polymer base fluid sold under the trade name "Dow F–60" can be used in the grease compositions of the invention.

The methylchlorophenyl silicone polymer may be employed as the sole oil component, or it may be employed in admixture with minor amounts of other oils, particularly other synthetic oils such as polyethers, polyglycols, diesters, polyesters or mixtures of such oils.

The diazotized benzidine thickening component should be present in the composition in an amount of from about 9 up to about 46.5 parts by weight of pigment, based on the weight of the composition. It is preferred that the diazotized benzidine pigment thickening component be present in the grease composition in an amount between about 20 and 40%, particularly 23–39%, by weight.

Suitable pigment components for the grease composition are either commercially available or readily obtainable by well-known methods involving diazotizing benzidine or a substituted benzidine and then coupling the diazotized product with a suitable acylacetaryl amide or N-arylpyrazolone, as described, for example, in German Patent 251,479 (1912).

These benzidine pigments are employed in finely-divided form, ordinarily in the form of particles below about 1 micron in diameter, and preferably below about 0.5 micron in diameter, which may be obtained either by suitably controlling the crystallization conditions during the preparation or by fine grinding. The above class of compounds includes the familiar Benzidine Yellows and the Vulcan Fast Reds, which are employed extensively as rubber pigments.

Suitable compounds include the following pigments:

bis(acetyl-N-phenylcarbamylmethyl)4,4′-disazo-3,3′-dichlorodiphenyl,
bis(acetyl-N-methoxyphenylcarbamylmethyl)4,4′-disazo-3,3′-dichlorodiphenyl, bis(acetyl-N-phenylcarbamylmethyl)4,4'-disazo-3,3'-dichlorodimethyldiphenyl, bis(1-phenyl-3-methyl-5-keto-4-pyrazolinyl)4,4'-disazo-3,3'-dimethoxydiphenyl, and bis(1-phenyl-3-methyl-5-keto-4-pyrazolinyl)4,4'-disazo-3,3'-dichlorodiphenyl.

Particularly preferred pigments include bis(acetyl-N-phenylcarbamylmethyl)4,4'-disazo-3,3'-dimethyldiphenyl, and bis(1-phenyl-3-methyl-5-keto-4-pyrazolinyl(4,4'-disazo-3,3'-dimethoxyphenyl The yield improving agent of the grease composition is present therein in a minor amount, between 0.5 to 3% by weight, sufficient to improve the yield of the resulting grease compositions. A preferred range for the most satisfactory results is from 1 to 2% of the aryl substituted aliphatic fatty acid.

The yield improving agent comprises a saturated aliphatic fatty acid wherein the aliphatic acid portion contains from 16 to 20 carbon atoms and contains a monocyclic aryl or a $C_1$–$C_3$ alkyl-substituted monocyclic aryl group thereon. Among the satisfactory fatty acids for use in the grease compositions of the invention are hexadecanoic acid, octadecanoic acid and eicosanoic acid. Suitable aryl group substituents thereon include the phenyl, tolyl, xylyl groups. These aryl substituents are attached more or less near the mid chain carbon atoms of the aliphatic chain, for example, the 8 or 9 carbon atom of hexadecanoic acid, the 9 or 10 carbon atom of octadecanoic acid or the 10 or 11 carbon atoms of eicosanoic acid.

It is to be understood that mixtures of these aryl substituted or $C_1$–$C_3$ alkyl-substituted aryl substituted aliphatic fatty acids can be used as the yield improving agent, for example, a mixture of 9-phenyloctadecanoic acid and 10-phenyloctadecanoic acid or 8-tolylhexadecanoic acid and 11-xylyleisocanoic acid and the like. A particularly preferred aryl-substituted aliphatic fatty acid is a mixture of 9- and 10-phenyloctadecanoic acid as the most satisfactory improvements in yield are thereby attained with this mixture.

The grease compositions of the invention can also contain minor amounts, i.e., 0.5 to 10% by weight of the composition of oxidation inhibitors, and corrosion inhibitors, stringiness agents, tackiness agents, lubricity agents, coloring materials and the like.

Suitable oxidation inhibitors include aryl amines such as diphenylamine, alpha- as well as beta-naphthylamine, para - phenylenediamine and N,N' - diphenyl - p - phenylaminediamine. Satisfactory corrosion inhibitors include, for example, lead naphthenate, sarcosine, N-acyl sarcosines and particularly N-cocoyl sarcosine, wherein cocoyl represents coconut fatty acids.

The grease compositions of the present invention can be prepared in a known manner such as by intimately mixing the thickening component and the aryl substituted fatty acid yield improver components together and then blending the resulting admixture with the silicone polymer base oil in a colloid mill to obtain a thorough dispersion of the pigment and the aryl substituted fatty acid in the silicone oils. An alternate procedure is to blend all of the components together with continued stirring. The mixing operation can be carried out at ordinary or elevated temperatures up to about 300° F. Corrosion and oxidation inhibitors can be added to the admixed composition in a conventional manner and mixing continued followed by milling to produce a uniform grease composition.

EXAMPLE 1

A grease composition was prepared from an admixture of a chlorophenyl silicone polymer oil, Versilube F–50, a diazotized benzidine pigment consisting of bis(1-phenyl-3-methyl-5-keto - 4 - pyrazolinyl)4,4' - disazo - 3,3' - dimethoxydiphenyl and a mixture of 9- and 10-phenyloctadecanoic acid. The grease composition was prepared in the following manner:

There was admixed in a grease kettle provided with an electric stirrer 900 parts of the pigment and 2,050 parts of the silicone polymer oil at 180° F. The heated mixture was divided into a number of equal portions. There was added to 476 parts of one of the heated portions 4.81 parts of a mixture of 9- and 10-phenyloctadecanoic acid with continued stirring for 0.5 hour. The stirred admixture was milled twice through a Premier colloid mill having a rotor-stator clearance of 0.002 inch.

EXAMPLE 2

A grease composition was prepared from an admixture of Versilube F–50, a diazotized benzidine pigment comprising bis(acetyl - N - phenylcarbamylmethyl) - 4,4'-disazo-3,3'-dimethyldiphenyl and a mixture of 9- and 10-phenyloctadecanoic acid. The grease composition was prepared in a manner similar to that of Example 1 above, except that the oil and pigment were mixed at 180° F., then milled for two passes through the colloid mill; the mixture of 9- and 10-phenyloctadecanoic acid component was added to the milled mixture and the resulting mixture was milled for two additional passes through the colloid mill.

CONTROL EXAMPLES A AND B

In a manner similar to that described in Examples 1 and 2 above, similar grease compositions were prepared using the components of Examples 1 and 2, respectively, except that no aryl-substituted aliphatic fatty acid was used in the control examples.

CONTROL EXAMPLES C AND D

In a manner similar to that described in Examples 1 and 2 above, grease compositions were prepared using the components of Examples 1 and 2 above, and octadecanoic acid in each case, in place of the mixture of 9- and 10-phenyloctadecanoic acid.

The table below sets forth the percentage compositions of the greases of Examples 1 and 2 and the control examples and also records the results of physical tests performed on these greases.

Table

| Component Wt., percent | Control Ex. A | Control Ex. C | Example 1 | Control Ex. B | Control Ex. D | Example 2 |
|---|---|---|---|---|---|---|
| Base Oil Versilube 5–50 | 69.5 | 68.8 | 68.8 | 70.0 | 69.3 | 69.3 |
| Pigment of Example 1 | 30.5 | 30.2 | 30.2 | | | |
| Pigment of Example 2 | | | | 30.0 | 29.7 | 29.7 |
| 9- and 10-phenyloctadecanoic Acid Mixture | | | 1.0 | | | 1.0 |
| Octadecanoic Acid | | 1.0 | | | 1.0 | |
| Tests on Product | | | | | | |
| Penetration [1]: | | | | | | |
|   Unworked | 182 | 167 | 159 | 268 | 223 | 204 |
|   Worked 60 strokes | 262 | 257 | 189 | 388 | 335 | 270 |
|   NLGI Consistency | 2 | 2 | 4 | 0 | 1 | 2 |

[1] Converted to ASTM from ¼ cone, ½ worker used.

Inspection of the data in the above table show that the incorporation of a minor amount of an aryl-substituted aliphatic fatty acid yielded improver in a diazotized benzidine pigment thickened silicone polymer oil improved the worked penetration values of the grease of Example 1. This grease was a No. 4 grade grease. In contrast, a grease composition containing a non-aryl-substituted fatty acid (Control Example C), or a grease free from any aliphatic fatty acid (Control Example A), did not exhibit any substantial improvement in yield value. These greases were No. 2 grade greases, respectively.

The data presented in the table for the grease composition of Example 2 further illustrated that the presence of an aryl-substituted aliphatic fatty acid in a pigment thickened grease improved the worked penetration value of a benzidine pigment thickened silicone polymer oil grease as the grease containing the aryl fatty acid was a No. 2 grade grease. It is to be noted that the grease composition of Control Example B above, which does not contain any aryl-substituted aliphatic fatty acid, was a No. 0 grade grease having a worked penetration value of 108 points greater than that of the grease of Example 2 above. The data further show that the use of a non-aryl-substituted aliphatic fatty acid in a grease composition, Control Example D had only a relatively slight effect on improving the consistency of the base grease.

The data in the table illustrate the unexpected advantages in yield resulting from the incorporation of an aryl-substituted saturated aliphatic fatty acid in a diazotized benzidine pigment thickened silicone polymer grease.

We claim:
1. A lubricating grease composition comprising from about 51 to 90% by weight of a methylchlorophenyl silicone polymer oil of lubricating oil viscosity thickened to a grease consistency with from about 9 to 46.5 percent by weight of a thickening agent consisting essentially of a diazotized benzidine pigment having the formula

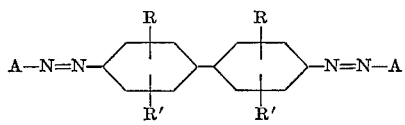

wherein A is selected from the group consisting of acylacetaryl amide, N-arylpyrazolone, and substituted acylacetarylamide and N-arylpyazolone radicals, R and R' are selected from the group consisting of hydrogen, methyl, methoxy and chlorine, said grease composition containing in an amount sufficient to improve the yield of the grease composition a saturated aliphatic fatty acid containing from 16 to 20 carbon atoms in the fatty acid moiety and having a member selected from the group consisting of monocyclic aryl and $C_1$–$C_3$ alkyl substituted monocyclic aryl radicals as a substituent on the aliphatic carbon chain.

2. A grease composition as claimed in claim 1 wherein the aryl-substituted aliphatic fatty acid is present in an amount between 1 and 2 percent by weight.

3. A grease composition as claimed in claim 1 wherein said silicone polymer oil has a viscosity in the range of from about 100 to 600 seconds Saybolt Universal at 100° F. and contains between about 4 to 12 percent by weight of chlorine.

4. A grease composition as claimed in claim 1, wherein said diazotized benzidine pigment is bis(acetyl-N-phenylcarbamylmethyl)-4,4'-disazo-3,3'-dimethyldiphenyl.

5. A grease composition as claimed in claim 1, wherein said diazotized benzidine pigment is bis(1-phenyl-3-methyl-5-keto-4-pyrazolinyl)-4,4'-disazo-3,3' - dimethoxydiphenyl.

6. A composition as claimed in claim 1 wherein said aryl-substituted aliphatic fatty acid is 9-phenyloctadecanoic acid.

7. A grease composition as claimed in claim 1 wherein said aryl-substituted aliphatic fatty acid is 10-phenyloctadecanoic acid.

8. A grease composition as claimed in claim 1 wherein said aryl-substituted aliphatic fatty acid is a mixture of 9-phenyloctadecanoic acid and 10-phenyloctadecanoic acid.

9. A composition as claimed in claim 1 containing about 0.5 percent by weight of a corrosion inhibitor and about 0.5 percent by weight of an oxidation inhibitor.

10. A composition as claimed in claim 1 comprising from 60 to 75 percent by weight of said silicone polymer oil thickened to a grease consistency with a thickening agent comprising from 23 to 39 percent by weight of bis(acetyl-N-phenylcarbomylmethyl)-4,4'-disazo-3,3' - dimethyldiphenyl, and containing from about 1 to 2 percent by weight of a mixture of 9- and 10-phenyloctadecanoic acid.

11. A grease composition as claimed in claim 1 comprising from 60 to 75 percent by weight of said silicone polymer oil, thickened to a grease consistency with 23 to 39 percent by weight of bis(1-phenyl-3-methyl-5-keto-4-pyrazolinyl)-4,4'-disazo-3,3' - dimethoxydiphenyl, and containing from 1 to 2 percent by weight of a mixture of 9- and 10-phenyloctadecanoic acid.

References Cited by the Examiner
UNITED STATES PATENTS

| | | | |
|---|---|---|---|
| 2,252,087 | 8/1941 | McNab et al. | 252—56 |
| 2,252,793 | 8/1941 | Watkins | 252—56 |
| 2,262,773 | 11/1941 | Lincoln et al. | 252—56 |
| 2,385,697 | 9/1945 | Flaxman | 252—56 |
| 2,880,177 | 3/1959 | Lyons et al. | 252—51.5 |
| 3,082,170 | 3/1963 | McCarthy et al. | 252—51.5 |
| 3,113,107 | 12/1963 | Borg | 252—56 X |

DANIEL E. WYMAN, *Primary Examiner.*

UNITED STATES PATENT OFFICE
CERTIFICATE OF CORRECTION

Patent No. 3,235,500                      February 15, 1966

Max J. Wisotsky et al.

It is hereby certified that error appears in the above numbered patent requiring correction and that the said Letters Patent should read as corrected below.

Column 3, line 10, for "-pyrazolinyl(4,4′-" read -- pyrazolinyl)4,4′- --; line 11, for "3,3′-dimethoxyphenyl" read -- 3,3′-dimethoxydiphenyl --; line 39, for "11-xylyleisocanoic" read -- 11-xylyleicosanoic --; column 4, in the Table, under the column heading "Control Ex. D", line 1 thereof, for "69 3" read -- 69.3 --; column 6, line 32, for "-phenylcarbomylmethyl" read -- phenylcarbamylmethyl --.

Signed and sealed this 31st day of January 1967.

(SEAL)
Attest:

ERNEST W. SWIDER
Attesting Officer

EDWARD J. BRENNER
Commissioner of Patents